UNITED STATES PATENT OFFICE.

CHARLES MYERS, OF AKRON, OHIO, ASSIGNOR, BY DIRECT AND MESNE ASSIGNMENTS, TO MICHAEL J. MURPHY, OF SAME PLACE, AND H. ROSENBAUM, OF CINCINNATI, OHIO.

CEMENT.

SPECIFICATION forming part of Letters Patent No. 624,522, dated May 9, 1899.

Application filed July 15, 1898. Serial No. 686,050. (No specimens.)

*To all whom it may concern:*

Be it known that I, CHARLES MYERS, of Akron, Summit county, and State of Ohio, have invented certain new and useful Improvements in Cements; and I do hereby declare the following to be a full, clear, and exact description of the invention, such as will enable others skilled in the art to which it pertains to make and use the same.

My invention relates to a cement-forming compound more especially designed for use in securing or attaching a vitreous facing or substance to a brick, or block, or slab of burnt clay or other earthy material.

The primary object is to provide a suitable cement that is tough and not brittle.

My improved cement consists of brimstone or sulfur and arsenic mixed in suitable proportions.

I have obtained desirable results by the mixture of a very small quantity of arsenic—for instance, one or two grains—with one pound of sulfur. The compound is fluidified by heat or in any approved manner and applied while it is fluid.

I have discovered that a small quantity of arsenic is sufficient to reduce the brittleness of the sulfur, and will consequently toughen the cement. More arsenic would render the compound expensive, and hence a tough cement that is not expensive is produced by my improved compound.

What I claim is—

1. A compound consisting of sulfur and arsenic, substantially as and for the purpose set forth.

2. A cement-forming compound consisting of sulfur and arsenic, in the proportions of a very small quantity of the arsenic to the quantity of sulfur employed.

3. A cement consisting of a fluidified compound of arsenic and sulfur in the proportions of from one to two grains of the arsenic to about one pound of the sulfur.

Signed by me, at Cleveland, Ohio, this 21st day of June, 1898.

CHARLES MYERS.

Witnesses:
C. H. DORER,
A. H. PARRATT.